United States Patent [19]

Sipler

[11] 4,059,293

[45] Nov. 22, 1977

[54] CONNECTOR

[76] Inventor: Clarence L. Sipler, Edgehill Road, Box 611, R.R. 1, Furlong, Pa. 18925

[21] Appl. No.: 636,438

[22] Filed: Dec. 1, 1975

[51] Int. Cl.² .............................................. F16L 21/00
[52] U.S. Cl. .................................... 285/236; 285/179; 285/423
[58] Field of Search ................. 285/236, 57, 237, 235, 285/226, DIG. 4, 229, 179, 423; 138/118, 121, 122, 133, 138, 173, 174

[56] References Cited

U.S. PATENT DOCUMENTS

| 214,991 | 5/1879 | Coler | 285/423 |
|---|---|---|---|
| 314,440 | 3/1885 | Eames | 138/122 X |
| 1,280,170 | 10/1918 | Crawford | 285/235 X |
| 1,345,971 | 7/1920 | Star | 285/226 |
| 2,547,983 | 4/1951 | Slattery | 285/423 X |
| 2,998,269 | 8/1961 | Houghton | 285/423 X |
| 3,796,447 | 3/1974 | Putter | 285/DIG. 4 |
| 3,861,721 | 1/1975 | Berghofer | 285/236 |

FOREIGN PATENT DOCUMENTS 394,768 12/1908 France .............................. 285/236

Primary Examiner—Dave W. Arola
Attorney, Agent, or Firm—Zachary T. Wobensmith, 2nd; Zachary T. Wobensmith, III

[57] ABSTRACT

A connector is disclosed for joining together rigid hollow tubular members which may move relative to each other which connector includes a casing of resilient material preferably elastomeric in nature, synthetic or natural rubber, the organic elastomers or any resilient plastic material, a preferred example being an outer casing of moulded natural or synthetic rubber with a plurality of reinforcement corrugations or ribs between straight end portions which are detachably secured to the tubular members, the corrugations or ribs having grooves on the inside of the casing adjacent thereto into which relatively rigid O-rings are locked in place thereby resisting collapse of the connector due to vacuum. The connectors can be straight or curved.

6 Claims, 5 Drawing Figures

CONNECTOR

The foregoing abstract is not to be taken as limiting the scope of my invention and in order to understand the full nature and extent of the technical disclosure of this patent reference must be made to the accompanying drawings and the following detailed description.

BACKGROUND OF THE INVENTION

1. Field of the Invention

A connector for joining tubular members of the flexible type with locked in internal O-rings to resist collapse but permit relative displacement between the tubular members is provided.

2. Description of the Prior Art

Connectors for joining tubular members such as the end of an air cleaner to the engine of a vehicle have been in use for many years. Such connectors are usually rigid and formed of metal. Other structures are formed of thick walled rubber to provide flexibility but such structures are subject to collapse due to the high internal vacuum to which they may be subjected.

Examples of such connectors are shown in the U.S. Pat. to Rumbell, No. 3,087,745, Star, No. 1,345,971, Taube, No. 833,426, Simpson, No. 2,047,713, Flagg et al., No. 2,834,965 and French Pat. No. 998,495. None of these structures are suitable for installations where there is considerable vibration and flexing between the air cleaner and engine such as occurs in many types of trucks and earth moving machinery, they are expensive to manufacture, and they do not provide internal support to resist collapse.

The connector of my invention is flexible, does not collapse due to internal vacuum, and is simple to manufacture.

SUMMARY OF THE INVENTION

This invention relates to a connector for joining hollow rigid tubular members which are displaced between themselves subjecting the connector to considerable flexure, which connector includes a casing of resilient material preferably elastomeric in nature, synthetic or natural rubber, the organic elastomers or any resilient plastic material, a preferred example being an outer shell of moulded rubber with a plurality of reinforcement corrugations or ribs between straight ends with O-rings locked in grooves on the inside preventing collapse of the connector when subjected to internal vacuum.

The principal object of the invention is to provide a connector which is flexible and does not collapse due to internal vacuum and can be subjected to considerable flexure without failure.

A further object of the invention is to provide a connector that can be straight or curved.

A further object of the invention is to provide a connector whicbh can be used with a variety of types of equipment, wherever a joinder is needed which will resist collapse, destruction or disconnecton due to encountered force including jarring, vibration, wear, bending, displacement or other interference, and regardless of the industry involved including but not limited to automotive connections, pipe lines, electrical conduits, fluid connectors, aerospace uses, oceanographic uses, bellows, and others.

A further object of the invention is to provide a connector which is simple to manufacture but sturdy and reliable in service.

Other objects and advantageous features of the invention will be apparent from the description and claims.

DESCRIPTION OF THE DRAWINGS

The nature and characteristic features of the invention will be more readily understood from the following description taken in connection with the accompanying drawings forming part hereof, in which.

It should, of course, be understood that the description and drawings herein are illustrative merely and that various modifications and changes can be made in the structure disclosed without departing from the spirit of the invention.

DESCRIPTION OF THE PREFERRED EMBODIMENTS

Figure 1:
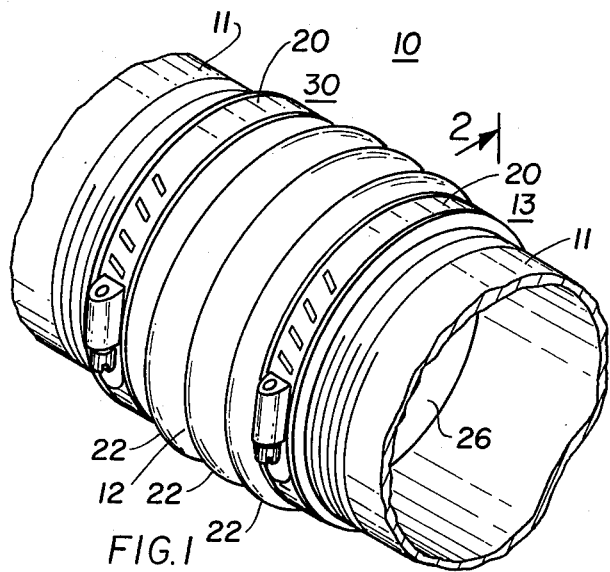
FIG. 1 is a view in perspective of one embodiment of the connector of my invention.
Figure 2:
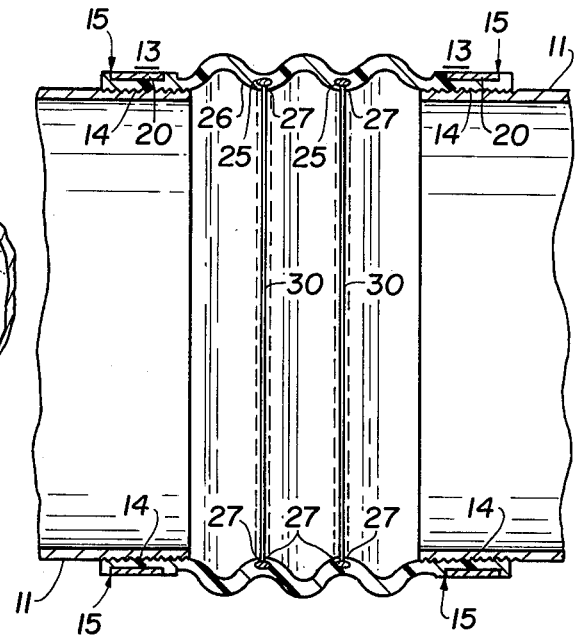
FIG. 2 is a vertical sectional view, enlarged, taken approximately on the line 2—2 of FIG. 1.

Referring now more particularly to the drawings and FIGS. 1 and 2, one embodiment of the connector 10 is illustrated of the straight type which is shown joining two hollow tubular members 11. The connector 10 has an outer casing 12 with band like end portions 13 which extend over a portion of members 11 with roughened internal portions 14 for gripping engagement with members 11, and with an outer depressed portion 15 which has band clamps 20 of well known type engaged therewith for retention of the ends 13 of connector 10 on members 11.

The casing 12 which is preferably formed of moulded rubber either natural or synthetic has reinforcement corrugations 22 between the ends 12 as illustrated in FIG. 2.

The interior of the corrugations 22 has two grooves 25 preferably mushroom shaped, outwardly from the inner surface 26 of casing 12 which are formed during the moulding process and which include flaps 27. In FIG. 2 the casing 12 is shown with O-rings 30 engaged in the grooves 25, which O-rings 30 are preferably of metal, but may be made of any firm material more rigid than the casing, such as ceramic, treated wood, graphite, carbon, strong plastic or others, and of a diameter about one half inch larger than the internal diameter of casing 12 so that for assembly the casing 12 is drawn over the O-rings 30 which expand and snap into the grooves 25.

The O-rings 30 thereby restrain the casing 12 from collapsng due to internal vacuum therein but permit flexing of the casing between the members 11, which flexing may involve decrease and increase of length of the casing 12 as well as change of alignment of the ends.

Figure 3:
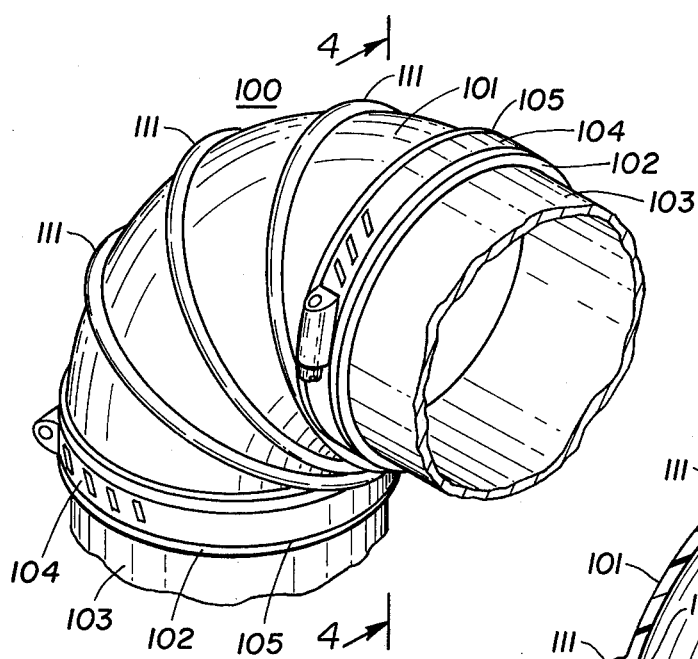
FIG. 3 is a view in perspective of another embodiment of the connector of my invention.
Figure 4:
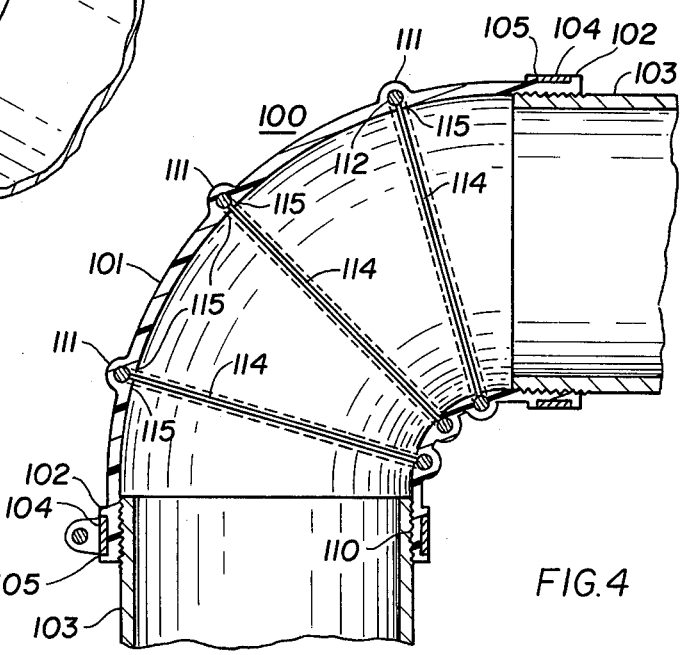
FIG. 4 is a vertical sectional view, enlarged taken approximately on the line 4—4 of FIG. 3.

Referring now to FIGS. 3 and 4 another embodiment of the connector 100 is therein illustrated which is shown as a 90° elbow. The connector 100 includes an outer casing 101 preferably with straight end portions 102 which are mounted to hollow tubular members 103 by band clamps 104 of well known conventional type engaged in outer grooves 105 in end portions 102.

The end portions 102 on the inside have a roughened surface 110 for improved gripping of the members 103.

The casing 101 is preferably formed of moulded rubber either natural or synthetic and as illustrated has three reinforcement ribs 111 moulded therein.

The ribs 111 have inner annular grooves 112 moulded therein which as shown in FIG. 4 can receive O-rings 114 like O-rings 30 which are additionally retained in the grooves 112 by flaps 115.

The O-rings 114 are of a diameter about one half inch larger than the internal diameter of casing 101 which is stretched over the rings 114 which snap into the grooves 112 and restrain the casing 101 from collapse due to internal vacuum on the casing 101.

Both the connector 10 and 100 can be bent somewhat between the tubular members 11 and 103 to accommodate for variations in alignment and such connectors can be extended to a limited extent in the longitudinal axial direction. A variety of angular configuration, diameters and lengths of connectors can be provided by varying the number of corrugations 22 or by varying the number of reinforcement ribs 111.

Figure 5:
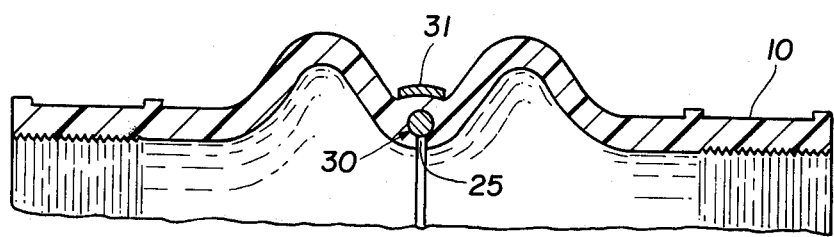
FIG. 5 is a view in cross-section, of a further embodiment of the connector of my invention.

Referring now to FIG. 5, whereas the earlier FIGS. have been designed primarily for negative pressure applications, they might not be suitable for positive applications where internal pressure is involved.

Accordingly, in FIG. 5, I have provided a retainer ring 31 disposed around the exterior periphery of the area where the internal reinforcing O-ring is located so that the ring is locked into position thus restricting the movement of the tube either externally or internally while in use as a connector. This will permit use with positive interior pressures. The exterior ring can be of any suitable material, such as metal, glass tape, reinforced plastic or others.

It will thus be seen that a connector has been provided with which the objects of the invention are achieved.

I claim:

1. A connector for joining together two rigid hollow tubular members which comprises
    a flexible casing with tubular end portions for engagement with the tubular members and having a wall portion therebetween with exterior and interior surfaces,
    said wall portion having
        at least one integral reinforcement member extending around the circumference of the wall portion and disposed intermediate said end portions,
        a circumferential groove in said member between the exterior and interior faces of said wall portion of said casing and communicating with the interior of the wall portion through said interior surface,
        said groove having interior integral marginal flaps extending toward each other along each edge thereof, and
        a rigid O-ring carried in said groove and retained therein by said flaps.
2. A connector as defined in claim 1 in which
    an exterior retainer ring is provided extending around the exterior surface of the wall of said casing in engagement therewith and in surrounding relation to said O-ring.
3. A connector as defined in claim 1 in which said reinforcement member is a corrugation.
4. A connector as defined in claim 1 in which said reinforcement member is a rib.
5. A connector as defined in claim 1 in which said casing is of rubber.
6. A connector as defined in claim 1 in which
    said end portions are detachably secured to the tubular portions by clamps.

* * * * *